3,415,664
METHOD OF PREPARING A FROZEN FOOD PACKAGE
Frederick Dorsey Montgomery, Chicago, Ill., assignor, by mesne assignments, to Montgomery, Frederick Dorsey, also known as F. Dorsey Montgomery, Chicago, Ill.
No Drawing. Filed July 8, 1964, Ser. No. 381,245
2 Claims. (Cl. 99—192)

This invention relates to a frozen food package and to a method for preparing such a package; the invention particularly relates to a food package which can be frozen and quickly warmed directly from the frozen state by reconstituting the food mass therein with a small amount of free moisture.

Packaged frozen food requires an extended period of time to be thawed out from the frozen state and to be warmed. This is true whether the frozen food mass is first thawed and then heated, or heat is applied to the frozen mass to both thaw and warm it. Such a long time is required because of the presence of water in the frozen state intermingled with the frozen food mass. The voids within the food mass are filled with frozen crystals and it requires long periods of time to melt such crystals as the heat moves from the outside of the food mass towards the interior of the food mass.

This problem is present with all food masses in which free moisture is present in the voids. It is a particular problem with those food masses which require some free moisture or water in the prepared condition. This free water is required in food masses having gravies or sauces, for example. Among such foods may be listed chop suey, beef stew, seafood newburgh, macaroni and cheese, beef strogonoff with noodles, chicken and noodles, beef goulash with noodles, spaghetti and meat balls and other dishes with formed paste comestibles, chicken with gravy, Swiss steak with mushroom gravy and the like. Such foods which have been frozen together with free amounts of water have had to undergo extensive periods of thawing before they could be warmed to put them in condition to be eaten. The thawing and heating period is often performed simultaneously, and such food mass has been known to take as long as 30 to 75 minutes to warm for eating. Among other disadvantages, it is clear that such long periods of warming make it impractical for restaurants, short order counters, and the like to use such foods to fill customer orders.

It is a primary object of this invention to provide a frozen food package in which the frozen food mass can be warmed without requiring extended periods of thawing and heating.

It is another object to provide a frozen food package which prior to heating must be reconstituted with a small amount of free water so that the product which is heated has a desired predetermined amount of free water to constitute a sauce, gravy or the like.

Another object is a frozen food package having a mass of frozen food such as meat and vegetables provided with a dry powder adjuvant which is converted into a liquid seasoning flavor, sauce, gravy or the like by the addition of a small amount of free water, which water likewise warms the mass of frozen food in a short time.

Another object is a frozen food package wherein a mass of frozen food in a water impervious and heat conducting container is quickly thawed and heated by a small amount of water so that the frozen food is quickly reconstituted into a prepared form containing free moisture such as a sauce, gravy or the like.

Another object is a frozen food package which may be directly heated, quickly warmed, and reconstituted with a small amount of free water to prepare a food which calls for a small amount of free moisture in the prepared state.

Another object is a frozen food package which can be directly heated with a small amount of free moisture in the prepared state over an oven flame as in a gas stove, an electric plate as in an electric stove, a hot plate grill, or a steam jacketed kettle.

Another object is a frozen food package which can be stocked by a restaurant or the like and be quickly prepared for serving when the particular food item is ordered by customers.

Another object is a method for preparing a frozen food package which may be quickly thawed and heated for serving.

Another object is a method for preparing a frozen food package which may be quickly thawed, heated for serving, and reconstituted into a prepared state with some free water in the form of a sauce, gravy or the like.

These and other objects are attained by the invention which will be described in detail.

It is now provided that a food mass is prepared and separated from substantially all the free moisture and water and then placed in a container. Such a food mass is then frozen within the container and sealed by a closure. The container may be a water impervious container such as a plastic bag of polyethylene and the food mass may be transferred therefrom to a saucepan or the like. The container is, however, preferably a heat conducting container such as the commonly used and widely known aluminium pans. The closure may be a stiff paper which is secured under a peripheral crimp of the aluminium pan. The closure may also be a plastic film which is applied and shrunken in place. Such a food is quickly prepared by adding a suitable small amount of free moisture to the food, and heating. The food is preferably heated in the heat conducting container by the added moisture which enters the many voids extending throughout the frozen food mass as hot water. Thus, many types of frozen food masses may be warmed to a suitable degree for ingestion in about three to about six minutes, whereas prior art thawing and heating has required as much as 75 minutes.

The frozen food package disclosed herein is particularly useful for those frozen food masses in which free moisture or water is desired in the prepared and heated food mass which is ready for serving. Such free moisture or water is present in flavoring adjuvants such as gravies, sauces, liquid flavorings, seasonings and the like. When the term "free moisture" or "free water" is used, it is intended to mean the water to reconstitute flavoring adjuvants, and it is also intended to mean the free water used to cook frozen food such as vegetables. Such free water is substantially removed from the food mass before it is frozen and it is later added to become a part of the prepared dish. The term does not include water which be bound within the cells of the food mass or otherwise chemically or physically bound to different ingredients of the food mass. It is neither desired nor necessary to separate such water from the food mass.

The term "food mass" is meant to include those foods which in the frozen state have "voids" extending throughout its mass. The term will include solid foods generally and will exclude liquid foods such as frozen soup. The number or size of such voids are not critical since they must be only large enough to admit heated water and steam. Pieces of meat and vegetables have voids therebetween and the structure of such meat and vegetables itself contains voids. The food mass with a larger distribution of voids will be warmed quicker after addition of the water, and food masses with a smaller number of voids will require a slightly longer time. In any event the longest time required will be substantially shorter than that required for foods frozen together with free water. Such food masses are preferably pre-cooked and include meat, poultry, vegetables and fish, and a mixture of meat, or fish or poultry with vegetables. If the food mass consists of small pieces of, say, meat and vegetables, then there are more voids provided which leads to an even faster heating time.

The frozen food packages which are particularly useful are those containing a solid or powdered adjuvant or mix which may be a thickener, a flavoring, a seasoning and the like. Such adjuvants or mixes are reconstituted into a gravy or a sauce after the addition of a small amount of free water. The adjucant or mix may contain dry, solid thickeners such as starch, flour and the like; and dry seasoning agents such as powdered tomato, salt, garlic, dry flavors such as beef extract, chicken base, dry spices such as paprika, dry coloring such as caramel, dry flavor enhancing agents such as monosodium glutamate, and other dry ingredients in powdered or other solid form. To such a package, a predetermined, measured quantity of water is added by the consumer. A desired amount of water may be determined by the packager who will set forth corresponding instructions on the container or the label. Thus, a chop suey food of desired gravy consistency and flavor content is provided by instructing the consumer to add three quarters of a cup of water, for example, to the frozen package, and then heating such package either directly or by transferring the food and water to a saucepan, for example. The preferred practice, of course, is to heat the food in the container. The consumer may mix the solid or powdered adjuvant with the food pieces to accelerate heating and preparation of the food mass for serving.

Such solid or powdered adjuvant or mixes are available in the market from different distributors. A dry powder adjuvant is available for beef gravy, for chop suey sauce and gravy, for beef strogonoff and the like. With such a frozen food package, not only is the food warmed quickly to be ready for serving, but the small amount of added free water reconstitutes the food to a desired liquid state.

The following illustration is presented to show the method of preparing a representative frozen food package in accordance with the foregoing teachings. It should be understood that such a description is only a representative embodiment and not an exclusive teaching.

BEEF STEW FROZEN FOOD PACKAGE

Meat and vegetables are cut into pieces suitable in size and number for a beef stew. The cut up pieces are present in the following amounts:

| | Ounces |
|---|---|
| Meat (beef) | 10 |
| Potatoes | 7½ |
| Carrots | 4¼ |
| Peas | 1⅔ |

The meat is cooked in a kettle with free water until the meat is cooked, at which time the water is reduced in volume. The remaining free water is drawn off from the bottom of the cooking kettle. The vegetables are cooked separately in free water for shorter periods of time so that they do not become too soft through overcooking. The vegetables and meat pieces are assembled in a heat conducting water impervious aluminium pan. The weight of the food mass after cooking is 19⅔ ounces. Dry powdered flavoring and thickening adjuvants are then added to the vegetables and meat in a total amount of 2½ ounces and the total mass is frozen. The adjuvants or mix contains the following ingredients in dry powdered form:

Tomatoes
Starch
Onion
Salt
Hydrolysed vegetable protein
Monosodium glutamate
Spice and seasoning The open top of the pan is sealed with a shrink plastic film and the sealed pan is inserted into a paper sleeve. A face of the sleeve has printed instructions for reconstituting and warming the food mass. The food is warmed and made ready for ingestion by adding 2½ cups of water to the food mass. This is a predetermined amount which will reconstitute the beef stew to a state with desired gravy consistency and flavor content. The container is heated directly by placing it over a flame or a hot electric plate and directing the heat to the bottom of the container. The added free water rapidly boils since it is not frozen. The heated liquid heats the food solids in the mass while simultaneously reconstituting the dry flavoring and thickening adjuvants. The food is warmed and ready to be eaten in about three to six minutes.

The foregoing invention can now be practiced, and such practitioners will know that the invention is not necessarily restricted to the particular embodiments presented herein. The scope of the invention is to be defined by the terms of the following claims as given meaning by the preceding description.

I claim:
1. The method of preparing a frozen food package which comprises the steps of
    cooking the desired food pieces in the presence of water,
    thereafter removing substantially all the free water present with the cooked food pieces,
    collecting the cooked food pieces together in a container to form a mass of food characterized by the presence of voids in the food mass,
    adding dried additives to the mass of mixed food,
    sealing the container,
    and freezing the food within the container while the voids remain.

2. The method of preparing a frozen food package which comprises the steps of
    cooking separately different kinds of food pieces in the presence of water,
    thereafter removing substantially all free water from the cooked food pieces,
    collecting the food pieces together in a container and forming a mass of food pieces characterized by the presence of voids within the mass,
    adding dried uncooked additives to the mass of mixed food,
    sealing the container,
    and freezing the food pieces within the container while the voids remain.

References Cited

UNITED STATES PATENTS

| 2,674,536 | 4/1954 | Fisher | 99—171 X |
| 2,768,086 | 10/1956 | Bliley | 99—194 X |
| 2,965,501 | 12/1960 | Harris | 99—192 |
| 3,220,856 | 11/1965 | Vischer | 99—192 |
| 3,235,390 | 2/1966 | Vischer | 99—194 |

HYMAN LORD, *Primary Examiner.*

U.S. Cl. X.R.

99—193, 194, 195